United States Patent
Benkert et al.

(10) Patent No.: US 7,230,362 B2
(45) Date of Patent: Jun. 12, 2007

(54) BRUSH HOLDER FOR AN ELECTRIC-MOTOR DRIVEN ACTUATOR AND AN ELECTRIC-MOTOR DRIVEN ACTUATOR

(75) Inventors: Matthias Benkert, Wuerzburg (DE); Rudolf Fiedler, Bad Mergentheim (DE)

(73) Assignee: Siemens AG, Munich (DE)

( * ) Notice: Subject to any disclaimer, the term of this patent is extended or adjusted under 35 U.S.C. 154(b) by 116 days.

(21) Appl. No.: 10/968,154

(22) Filed: Oct. 20, 2004

(65) Prior Publication Data

US 2005/0264127 A1    Dec. 1, 2005

(30) Foreign Application Priority Data

Oct. 29, 2003    (EP)    ................................ 03024938

(51) Int. Cl.
*H02K 5/24*    (2006.01)
(52) U.S. Cl. ........................................ 310/239; 310/51
(58) Field of Classification Search ................ 310/239, 310/51, 242
See application file for complete search history.

(56) References Cited

U.S. PATENT DOCUMENTS

| | | | | |
|---|---|---|---|---|
| 3,745,393 | A | * | 7/1973 | Spors .......................... 310/239 |
| 3,892,987 | A | * | 7/1975 | Noodleman .................. 310/46 |
| 4,959,576 | A | * | 9/1990 | Horibe et al. ................ 310/239 |
| 5,015,897 | A | | 5/1991 | Inagaki et al. |
| 5,159,221 | A | * | 10/1992 | Miyazaki et al. ............ 310/239 |
| 5,440,186 | A | * | 8/1995 | Forsell et al. ................ 310/239 |
| 5,453,646 | A | * | 9/1995 | Gleixner et al. .............. 310/51 |
| 5,453,649 | A | * | 9/1995 | Blanchet ........................ 310/71 |
| 5,528,093 | A | * | 6/1996 | Adam et al. .................. 310/89 |
| 5,539,264 | A | * | 7/1996 | Kuragaki et al. ............ 310/239 |
| 6,201,326 | B1 | * | 3/2001 | Klappenbach et al. .... 310/75 R |
| 6,225,717 | B1 | * | 5/2001 | Burger et al. ................. 310/71 |
| 6,246,144 | B1 | * | 6/2001 | Hockaday et al. .......... 310/242 |
| 6,333,580 | B1 | * | 12/2001 | Steinbart et al. ............ 310/239 |
| 6,356,003 | B1 | * | 3/2002 | Fiorenza et al. ............ 310/239 |
| 6,903,484 | B1 | * | 6/2005 | Kuhlmann-Wilsdorf .... 310/239 |

(Continued)

FOREIGN PATENT DOCUMENTS

DE    4241405 A1    6/1994

(Continued)

OTHER PUBLICATIONS

Derwent-Abstract-EP-0474904A1; Mar. 18, 1992; Siemens Aktiengesellschaft, Wittelsbacherplatz 2, D-8000 München (Germany).

(Continued)

*Primary Examiner*—Darren Schuberg
*Assistant Examiner*—Ondria Garner
(74) *Attorney, Agent, or Firm*—Siemens AG

(57) ABSTRACT

An electric-motor driven actuator has a housing, in which a motor and a carrier plate are arranged and the carrier plate is connected in a fixed manner to a brush holder. The brush holder has a first brush holder which is rigidly connected to the carrier plate. A second brush holder component is also provided which is mechanically coupled to the first brush holder component and is decoupled in a vibration-neutralizing manner from the first brush holder component via at least one damping element and which holds brushes via which contact can be made with a commutator of the motor.

17 Claims, 3 Drawing Sheets

U.S. PATENT DOCUMENTS

| | | | |
|---|---|---|---|
| 6,927,523 B2 * | 8/2005 | Okamoto | 310/242 |
| 6,965,178 B2 * | 11/2005 | Takahashi et al. | 310/68 R |
| 6,967,426 B2 * | 11/2005 | Tsuge et al. | 310/239 |
| 6,977,458 B2 * | 12/2005 | Kraus et al. | 310/239 |
| 7,010,959 B2 * | 3/2006 | Dingfelder et al. | 73/37.6 |
| 2002/0163279 A1 * | 11/2002 | Mueller et al. | 310/239 |
| 2002/0163280 A1 * | 11/2002 | Nakajima et al. | 310/239 |
| 2004/0119370 A1 * | 6/2004 | Tekawade | 310/239 |
| 2006/0043818 A1 * | 3/2006 | Chen | 310/239 |

FOREIGN PATENT DOCUMENTS

| | | |
|---|---|---|
| DE | 19805185 A1 | 8/1999 |
| DE | 10314397 A1 * | 10/2004 |
| EP | 0474 904 A1 | 3/1992 |
| EP | 0625 818 A1 | 11/1994 |
| JP | 05227698 | 9/1993 |
| JP | 2003259608 A * | 9/2003 |

OTHER PUBLICATIONS

Derwent-Abstract-EP-0625818A1; Nov. 23, 1994; Valeo Systemes D'Essuyage, 11, rue Faraday; F-78180 Montigny-Le-Bretonneux, France.

Derwent-Abstract-DE-4241405A1: Jun. 16, 1994; Robert Bosch GmbH, D-70469 Stuttgart (Germany).

Derwent-Abstract-DE-19805185A1: Aug. 12, 1999; Robert Bosch GmbH, D-70469 Stuttgart (Germany).

* cited by examiner

BRUSH HOLDER FOR AN ELECTRIC-MOTOR DRIVEN ACTUATOR AND AN ELECTRIC-MOTOR DRIVEN ACTUATOR

CROSS REFERENCE TO RELATED APPLICATIONS

The present application claims priority to priority European patent application 03 024 938.7, filed on Oct. 29, 2003, which is herein incorporated by reference.

BACKGROUND OF THE INVENTION

The invention relates to a brush holder for an electric-motor driven actuator and an electric-motor drive actuator. Known electric-motor driven actuators have a housing, in which a motor and a carrier plate are arranged. The carrier plate is connected in a fixed manner to a component of the brush holder having brushes, which make contact with a commutator of the motor.

Such actuators are for example deployed in motor vehicles as drives for sunroofs, window raising systems, seat adjustment systems or belt tensioners. Such actuators have to be configured as compactly as possible given that there is frequently only a small amount of space available for them and should be such that they can be manufactured at low cost. Such actuators can be manufactured at low cost, if as many components as possible, such as the electronics housing, which holds the electronic control system for the motor, and even significant components of the brush holder are made of a plastic material, preferably a thermoplastic injection-molded plastic material. However plastic components transmit vibration very readily. This can cause the electric-motor driven actuator to vibrate significantly during operation or to emit loud noises. This is however usually not desirable for reasons of user comfort, e.g. when used in a motor vehicle.

An electric-motor driven actuator for a motor vehicle sunroof is known from DE 198 05 185 A1. The actuator has an electric motor, which has a speed-transforming transmission comprising a worm shaft and a worm wheel. The electric motor is arranged in a cup-shaped field frame, which is flange-mounted on a transmission housing. The transmission housing holds a printed circuit board, which is connected in a rigid manner to a brush holder. The brush holder is provided for radial slip-fit assembly in respect of the drive shaft of the electric motor. The brush holder is manufactured by plastic injection molding.

SUMMARY OF THE INVENTION

The object of the invention is to create a brush holder, which is simple and allows the electric-motor driven actuator to operate in a quiet manner with little vibration. According to a further aspect of the invention, the object is to create an electric-motor driven actuator with a brush holder, which is simple in structure and ensures quiet operation with little vibration.

The object is achieved by the features of the independent claims. Embodiments of the invention are characterized in the subclaims.

With regard to the brush holder for an electric-motor driven actuator, the invention is characterized by a first brush holder component, which is supported by a carrier plate, for example an electric printed circuit board, and is connected rigidly to said carrier plate for this purpose and a second brush holder component having brushes by means of which contact can be made with a commutator of the electric-motor driven actuator. The second brush holder component is thereby supported by the first brush holder component, being mechanically coupled to the said first brush holder component whilst at the same time being decoupled from it in a vibration-neutralizing manner by at least one damping element. The decoupling of the first brush holder component from the second brush holder component in a vibration-neutralizing manner is ensured simply in that vibrations due to the brushes rubbing across the commutator segments during ongoing operation of the actuator are significantly damped. On the other hand the first brush holder component, when incorporated in the electric-motor driven actuator, is connected in a fixed manner to the carrier plate so that reliable electrical contact with the carrier plate can also be ensured in a simple manner, for example by means of a soldered connection.

Because the second brush holder component has a U-shaped recess to accommodate the commutator of the electric-motor driven actuator, the brush holder can be inserted into the actuator in a radial direction in respect of the commutator secured on a drive shaft. This allows very compact configuration of the electric-motor driven actuator, simple configuration of the motor housing and simplified assembly of the brush holder during manufacture of the actuator.

The annular configuration of the at least one damping element and the arrangement of at least one assigned location pin on the first and/or second brush holder component, on which the damping element is fitted, mean that the damping element is held in its predefined position in a simple manner by the location pin and the two brush holders can be assembled together in a simple manner.

In a further advantageous embodiment of the brush holder guides are configured in the first and second brush holder components for assembly pins such that, when inserted, the assembly pins couple the first and second brush holder components rigidly at least in relation to a degree of freedom and at the same time retain the two brushes in a predefined assembly position.

This allows the brush holder to be transported securely and be assembled with reliable accuracy of position in the electric-motor driven actuator in a simple manner. After insertion of the brush holder in the electric-motor driven actuator and before first use, the assembly pins are drawn out through openings for this purpose in the motor housing. This releases the vibration-neutralizing decoupling of the first brush holder component from the second brush holder component and at the same time the brushes, which are pressed against the segments of the commutator by spring pressure.

In a further advantageous embodiment of the brush holder the first brush holder component has spigots on the side opposite the carrier plate to fix/center the brush holder in the motor housing. This has the advantage that the brush holder can be centered simply in a motor housing of the electric-motor driven actuator during assembly. Also with a U-shaped recess in the first and/or second brush holder component, deformation of the U-shaped recess is prevented during assembly in the electric-motor driven actuator.

In a further advantageous embodiment of the brush holder a recess is provided in the first brush holder component to accommodate an earth contact, with the earth contact inserted therein, whereby the recess and the earth contact are configured such that on the one hand the earth contact can be connected in a fixed manner to the carrier plate configured as a printed circuit board and on the other hand such that, when the brush holder is incorporated in the electric-motor driven actuator, it is in contact with a motor housing, also referred to as the field frame. Reliable earthing of the field frame can thus be ensured, whilst at the same time allowing compact configuration of the brush holder.

With regard to the electric-motor driven actuator, the invention is characterized by a housing, in which a motor, a carrier plate and a brush holder are arranged, whereby the carrier plate is configured as an electric printed circuit board and is connected in a fixed manner to the first brush holder component and whereby contact is made with a commutator of the motor via the brushes held in the brush holder.

In an advantageous embodiment of the electric-motor driven actuator the housing comprises a motor housing, in which cutouts are provided, through which assembly pins are accessible from outside, which couple the first and second brush holder components rigidly together before and during assembly and at the same time retain the brushes in a predefined assembly position. This allows simple and accurate assembly of the brush holder in the motor housing and subsequent removal of the assembly pins to release the brushes and the vibration-neutralizing decoupling.

If the brush holder is fitted with spigots, which are accommodated by the cutouts in the motor housing during assembly, a centering effect results during the joining process between brush holder and motor housing. In a simple manner this prevents a brush holder component being damaged due to inaccuracies during assembly and at the same time ensures that the brush holder is secured axially in respect of the motor housing. This ensures accurate assembly of the brush holder in the electric-motor driven actuator.

In a further advantageous embodiment of the electric-motor driven actuator the carrier plate is coupled via damping elements to the carrier plate housing and/or the carrier plate housing cover. This has the advantage that, if the damping elements are configured appropriately, the carrier plate is tensioned in a fixed manner in the motor housing with the brush holder, preferably in the region of its spigots or any bearing surfaces, and at the same time vibration-neutralizing decoupling of the carrier plate in respect of the carrier plate housing or the carrier plate housing cover is ensured. This results on the one hand in the accurate positioning of the brush holder in the motor housing and on the other hand in vibration damping and a further reduction in vibration or noise emissions.

BRIEF DESCRIPTION OF THE SEVERAL VIEWS OF THE DRAWINGS

Exemplary embodiments of the invention are described in more detail below with reference to the schematic drawings, in which.

DETAILED DESCRIPTION OF THE INVENTION

Figure 1:
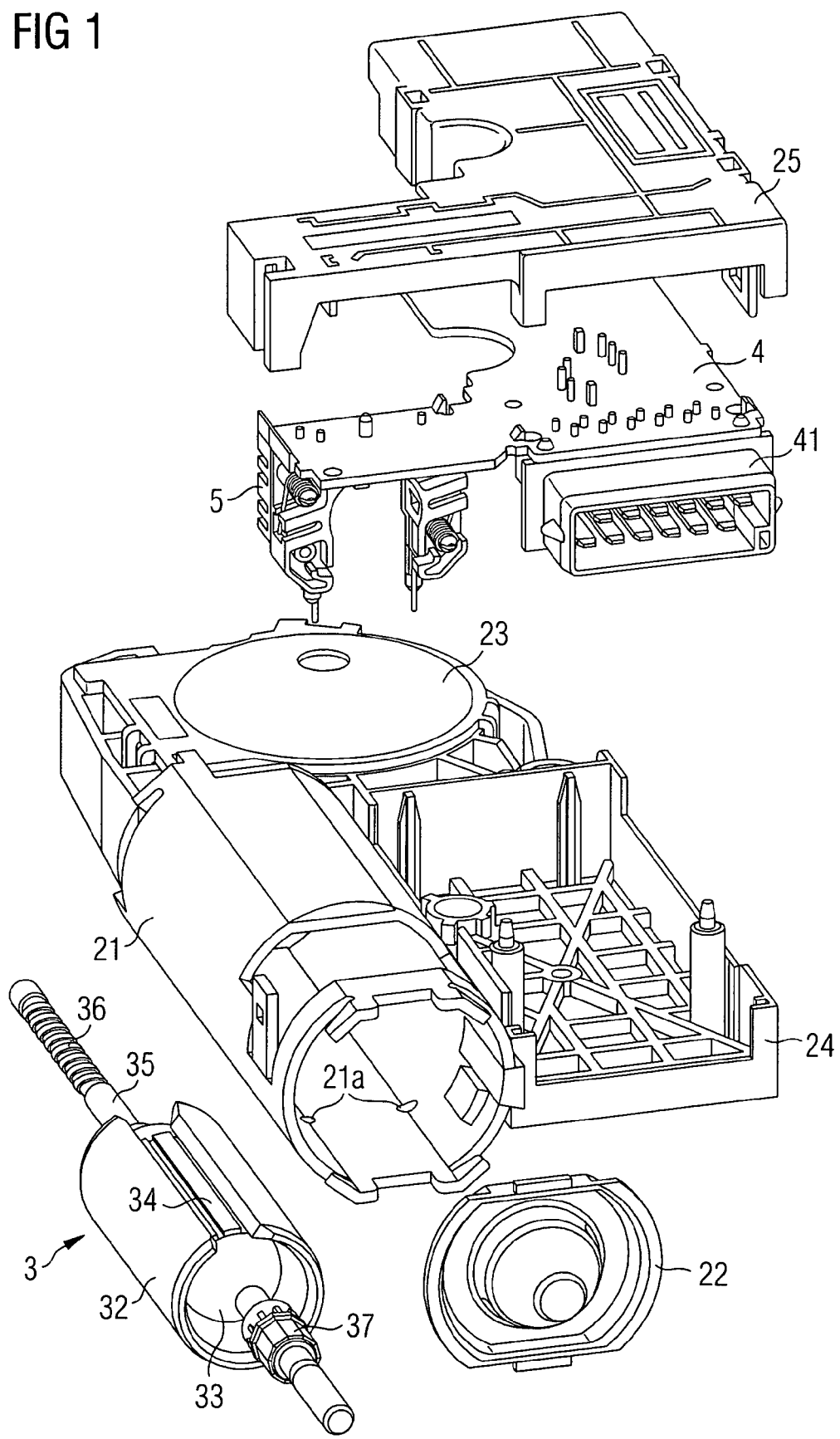
FIG. 1 shows an explosion diagram of the electric-motor driven actuator.

Elements with the same structure and function are denoted with the same reference characters in all the Figures.

An electric-motor driven actuator (FIG. 1) has a motor housing 21, a motor housing cover 22, a transmission housing 23, a carrier plate housing 24 and a carrier plate housing cover 25. The transmission housing 23 accommodates a transmission, which is preferably configured as a speed-transforming transmission.

The transmission housing 23, the carrier plate housing 24 and the carrier plate housing cover 25 are preferably made of plastic, in particular a thermoplastic. Only the motor housing 21 and where applicable the motor housing cover 22 are made of metal. The motor housing can for example be configured as a rolled metal board or a drawn field frame.

The motor housing 21 is configured such that a motor 3 can be inserted in the axial direction. The motor is preferably a permanent-field direct current motor. It has a field frame, in which permanent magnets 32 are arranged. The field frame is preferably the motor housing 21. It also has an armature 33, which is provided with coils and has an armature shaft 35, which is coupled to a spindle 36 or forms a single piece with said spindle. The spindle 36 engages in a worm wheel of the transmission. A commutator 37 with commutator segments is also arranged on the armature shaft 35, said segments being connected electrically to each of these assigned coils 34.

A carrier plate 4 is also provided, which is configured as an electric printed circuit board and is coupled to a connector holder 41. At the same time the printed circuit board can serve as a base for an electronic circuit, for example to control the actuator. A brush holder 5 is also coupled to the carrier plate 4. The brush holder 5 has a first brush holder component 51 (FIG. 2), having a U-shaped recess 510 to accommodate the commutator 37. A bearing surface 511 is also configured on the first brush holder component 51, at which the first brush holder component 51 rests on the carrier plate 4, when snap-hooks 512 are latched to the carrier plate 4. The first brush holder component 51 is connected rigidly to and brought into electrical contact with the carrier plate 4 by means of a soldered or even a welded connection, preferably in the region of the bearing surface 511 and preferably after snap-hooks have been latched to the carrier plate 4.

The first brush holder component 51 also has spigots 513, which are inserted in cutouts 21a in the motor housing 21 during assembly of the brush holder 5. This ensures in a simple manner that the U-shaped recess 510 of the first brush holder component 51 is not compressed during assembly and also that the brush holder 5 is secured axially in the motor housing 21.

Bearing surfaces 514 are also configured on the first brush holder component 51, by means of which the first brush holder component 51 rests on the wall of the motor housing 21. The bearing surfaces 514 are preferably manufactured very accurately and ensure additional centering of the brush holder 5 in the motor housing 21. In a simpler embodiment of the brush holder 5 just the spigots 513 or just the bearing surfaces 514 can be provided. Locating pins 515 and holders 516 are also configured in the first brush holder component 51 for damping elements 54 and assigned locating pins 521 of a second brush holder component 52.

The first brush holder component 51 also has holders 517 for electric throttles 518. When the brush holder 5 is assembled, the throttles 518 are connected in an electrically conductive manner to a corresponding terminal on the carrier plate 4. To this end the throttles 518 are preferably soldered to the carrier plate in the region of their lower end in respect of the plane of projection.

A recess 519 is also provided for an earth contact 55 in the first brush holder component 51. The earth contact 55 is inserted into the recess 519. The recess 519 and the earth contact 55 are configured such that the earth contact can be connected on the one hand in an electrically conductive manner to the carrier plate 4, in particular a printed conductor arranged thereon. If the brush holder 5 is assembled in the electric-motor driven actuator, the one free end of the earth contact 55 makes electrical contact with a printed conductor on the carrier plate 4, preferably by means of a soldered connection. The earth contact is configured in one sub-area in the nature of a leaf spring, such that it makes contact with the motor housing 21 when the brush holder 5 is assembled in the actuator. This ensures reliable earthing of the motor housing 21 in a simple manner.

The second brush holder component 52 also has a U-shaped recess 520 to accommodate the armature shaft 35 with the commutator 37. Location pins 521 are also configured in the second brush holder component 52. Holders for the damping elements 54 and the location pins 515 of the first brush holder component 51 are also configured in the second brush holder component 52. Guides 530 for the assembly pins 53 are also configured in the first and second brush holder components 51, 52.

Two brush chambers 522 are also provided in the second brush holder component, each of which holds a brush 523, each of which is pressed by a spring 526 against the commutator segments of the commutator 37 when the brush holder 5 is fully assembled in the actuator. The brushes 523 are preferably connected in an electrically conductive manner by means of a flexible lead to the end of the throttle 518 facing away from the carrier plate 4.

Spring holders 525 are configured on the second brush holder component 52 for each of the springs 526. Each spring holder 525 has a groove to accommodate a free end of the spring 526. The spring is fitted onto the spring holder 525 with the one free end in the groove of the spring holder 525 and then tensioned by corresponding rotation of the further free end. The further free end then presses against the brush 523 and is guided in the spring groove 524 of the brush chamber 522.

During assembly of the brush holder 5 the damping elements 54 are fitted onto the respective location pins 515 and 521 of the first and second brush holder components 51, 52. The damping elements 54 are preferably configured as annular and made of an elastomer for example. The damping elements 54 can however be made from other materials with corresponding elasticity and damping properties, such as NBR elastomers, Si elastomers or polyurethane.

The first and second brush holder components 51, 52 are then connected together, by inserting the location pins 515 of the first brush holder component 51 in the holders in the second brush holder component 52 and inserting the location pins 521 of the second brush holder component 52 in the holders 516 of the first brush holder component 51. The location pins 521 are preferably provided with latching lugs, which latch in the holders 516. The latching lugs are arranged on the location pins 515 such that, when the latching lugs are latched, a predefined axial tensioning force acts on the damping elements 54 through the first brush holder component and the second brush holder component 51, 52 and the first brush holder component 51 is decoupled in a vibration-neutralizing manner from the second brush holder component 52 at the same time. Vibration-neutralizing decoupling in this context means that vibrations due to the brushes 523 rubbing across the commutator segments of the commutator 37 are significantly damped. The amplitude of said vibrations is for example damped by at least 30%.

The frequency of the vibrations generated by the transition of the brushes 523 from one commutator segment to the next commutator segment is a function of the speed of the motor 3 and the number of commutator segments. If the motor 3 has a speed of 5000 revolutions per minute and is operated as a function of load at 3000 to 5000 revolutions per minute and has a commutator 37 with 10 commutator segments, the frequency of the vibrations is between 500 and 1000 Hz.

The secoIn a next assembly step the first and second brush holder components 51, 52 so are pressed further against each other so that the guides 530 for the assembly pins 53 of the first and second brush holder components 52 are aligned with each other. The assembly pins 53 are then inserted into the guides 530 of the first and second brush holder components 51, 52. The guides 530 are configured such that, when the assembly pins 53 are inserted, the first and second brush holder components 51, 52 are coupled rigidly to each other and at the same time the brushes are retained in a predefined assembly position. In the embodiment shown in the Figures the guides 530 for the assembly pins 53 run concentrically within and in an axial direction in respect of the spigots 513 of the first brush bolder component 51. The assembly position of the brushes 523 is advantageously defined such that the brushes 523 are at a predefined distance from the commutator segments, when the brush holder 5 is inserted in the motor housing 21. It can thereby be ensured in a simple manner that the brush holder 5 can be inserted in the motor housing 21 radially in respect of the armature shaft 35 in a simple manner, when the motor 3 is already in the motor housing 21. It is also thereby ensured that during transport of the brush holder 5 or even during insertion of the brush holder 5 in the motor housing 21 the individual elements of the brush holder remain in a fixed position in respect of each other.

The assembly pins 53 are preferably configured to be of such a length and are arranged in the guides such that they project out of the spigots 523 to a predefined degree. On insertion of the brush holder 5 in the motor housing 21, the assembly pins cause the brush holder 5 to be roughly centered, as soon as they engage in the cutouts 21a of the motor housing 21. As the brush holder 5 is inserted further into the motor housing 21, the spigots 513 then engage in the cutouts 21a of the motor housing 21. On the one hand this prevents the U-shaped recess 510 of the first brush holder component 51 being compressed by pressure against the motor housing wall and also the brush holder is secured in the motor housing 21 axially in respect of the armature shaft 35 of the motor.

In the final assembly position of the fully inserted brush holder 5 in the motor housing 21 the brush holder rests on bearing surfaces 514, which are configured in the first brush holder component 51, on the wall of the motor housing 21 and center the brush holder 5 in the motor housing 21. In a simpler embodiment of the brush holder 5 alternatively just the spigots 513 or just the bearing surfaces 514 can be provided. The bearing surfaces are manufactured with a very small manufacturing tolerance.

When the brush holder 5 has been inserted into its predefined assembly position in the motor housing 21, the assembly pins 53 are removed. Because the guides for the assembly pins 53 run in the axis of the spigots 513 and the assembly pins 53 project beyond the spigots 513, in the example shown the assembly pins 53 can be drawn out of the brush holder 5 through the cutouts 21a of the motor housing 21.

As soon as the assembly pins 53 have been drawn out of the brush holder 5, the first brush holder component 51 is decoupled in a vibration-neutralizing manner from the second brush holder component 52 and the springs 526 can press the brushes 523 against the commutator segments. This is made possible in that the damping elements are arranged between the first and second brush holder components and the two brush holder components do not come into contact with each other except in the region of the latches of the location pins 515, 521. To this end it is necessary for the latching lugs to be at such a distance from each other on the location pins 515, 521 that after the latching lugs have latched into the holders 516 assigned to the respective location pin 515, 521 there is still axial play between the first and second brush holder components 51, 52 and the location pins are configured such that there is still radial play in the assigned holders 516. In this manner, if the location pins 515 and 521 and the holders 516 are configured appropriately, the first and second brush holder components 51, 52 are connected together both axially and also in a radial direction principally via the damping elements and are thereby decoupled in a vibration-neutralizing manner. In this way it can be ensured simply that vibrations in the second brush holder component 52 are only transmitted to the first brush holder component 51 after being significantly damped.

Figure 3:
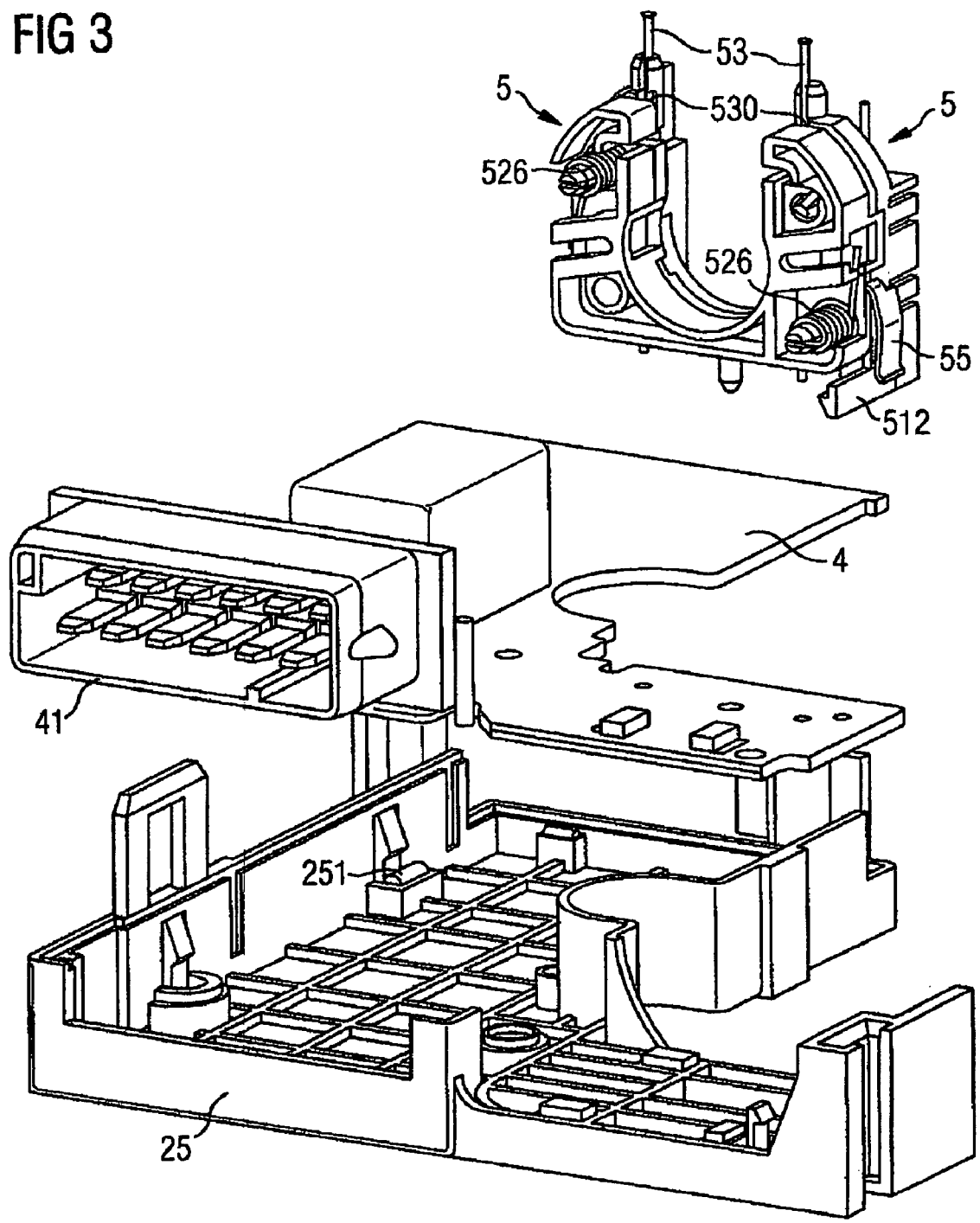
FIG. 3 shows an explosion diagram of the brush holder 5, a carrier plate 4 and a carrier plate housing cover 5.

The carrier plate 4 (FIG. 3) is preferably decoupled from the motor housing cover 25 in a vibration-neutralizing manner by means of further damping elements 251, which are preferably arranged in the carrier plate housing cover 25. The force transmitted when the further damping means 251 are pressed onto the carrier plate 4 means that the brush holder 5 is advantageously tensioned on its bearing surfaces 514 or the spigots 513. The further damping elements 251 can however also be arranged on the carrier plate 4 and interact correspondingly with the carrier plate housing cover 25 or even interact with the carrier plate housing 24 or be arranged on this.

Figure 2:
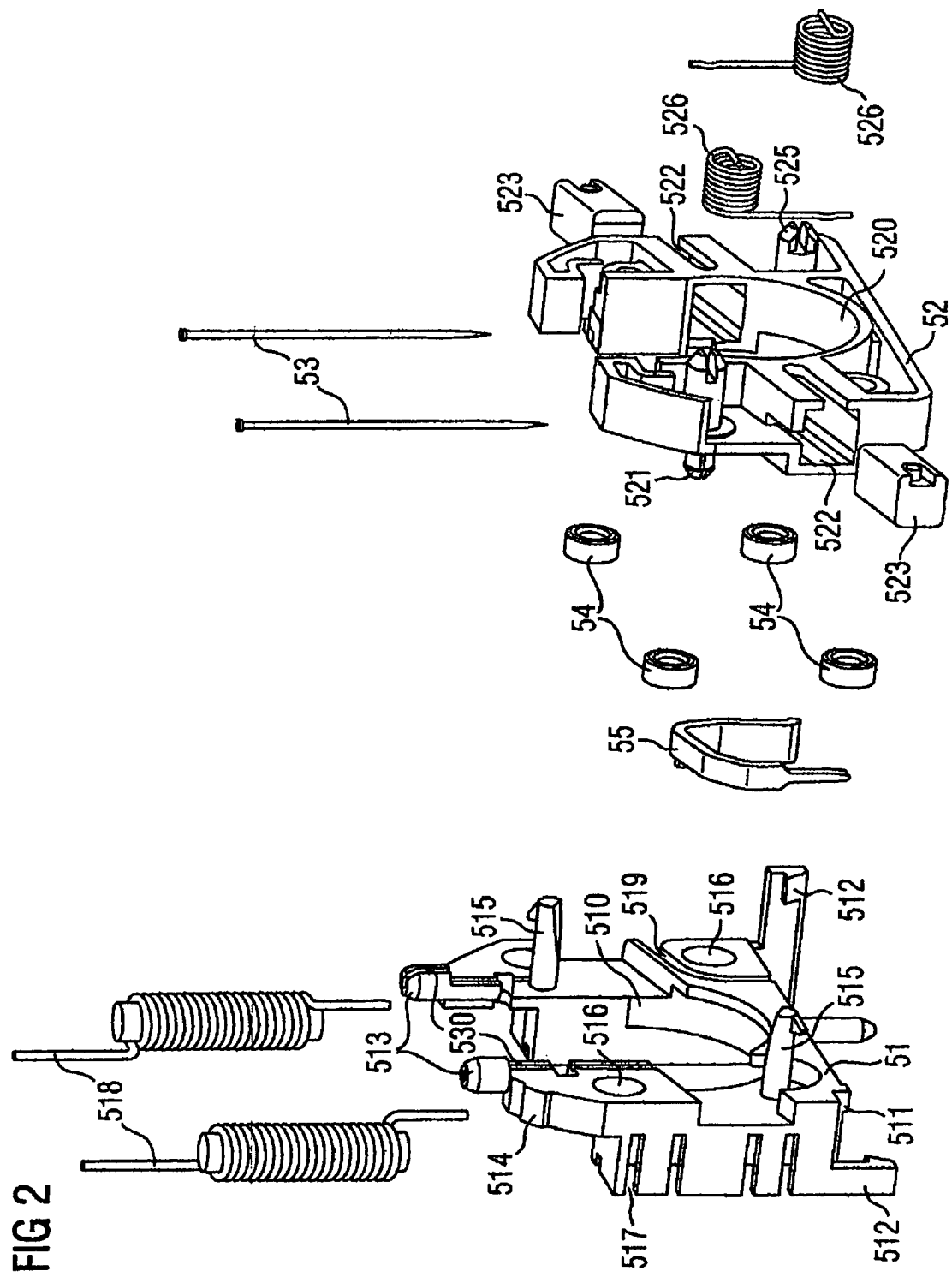
FIG. 2 shows an explosion diagram of the brush holder 5.

Instead of the annular damping elements 54 shown in FIG. 2, fewer or more annular damping elements 54 can also be provided. The damping elements can also have a different form, which is appropriate for decoupling the first brush holder component 51 from the second brush holder component 52 in a vibration-neutralizing manner. An essentially flat plastic component could also be used as the damping element or even a plurality of correspondingly configured plastic components.

The invention claimed is:

1. A brush holder for an electric-motor driven actuator, comprising:
    a motor housing with a first brush holder component supported by a carrier plate and rigidly connected thereto,
    a second brush holder component arranged to hold brushes, wherein the brushes are configured to contact a commutator fixed on an armature shaft of the electric-motor drive,
    whereby the second brush holder component is supported by the first brush holder component, and decoupled against vibrations therefrom by means of at least one damping element, and
    whereby at least the second brush holder component has a U-shaped recess to accommodate the commutator by radial slip-fit assembly of the brush holder.

2. The brush holder according to claim 1, wherein the at least one damping element is configured as annular and the first and second brush holder components each have at least one holding means, preferably a location pin, which holds the damping element.

3. The brush holder according to claim 1, wherein guides for receiving assembly pins are configured in the first and second brush holder components such that assembly pins inserted therein couple the first and second brush holder components rigidly to each other at least in relation to a degree of freedom and retain the brushes in a predefined assembly position.

4. The brush holder according to claim 1, wherein the first brush holder component comprises spigots, which when the actuator is assembled, project into cutouts in the motor housing of the actuator.

5. The brush holder according to claim 4, wherein at least some of the guides in the first brush holder component run within and in an axial direction with respect to the spigots.

6. The brush holder according to claim 1, further comprising:
    a recess arranged in the first brush holder component to accommodate an earth contact, the earth contact being inserted therein, the recess and the earth contact configured such that the earth contact may be connected in an electrically conductive manner to a printed conductor on the carrier plate and, when the brush holder is assembled, makes electrical contact with the motor housing of the actuator.

7. An electric-motor driven actuator, comprising:
    a housing in which a motor, a carrier plate and a brush holder are arranged, wherein the brush holder comprises:
    a motor housing with a first brush holder component supported by the carrier plate and rigidly connected thereto,
    a second brush holder component arranged to hold brushes, wherein the brushes are configured to contact a commutator fixed on an armature shaft of the electric-motor drive,
    wherein the second brush holder component is supported by the first brush holder component, and decoupled against vibrations therefrom by means of at least one damping element, and
    wherein at least the second brush holder component has a U-shaped recess to accommodate the commutator by radial slip-fit assembly of the brush holder;
    wherein the carrier plate is configured to make contact via the brushes with the commutator of the motor; and
    wherein the housing further comprises a motor housing in which cutouts are provided, the cutouts comprising openings through which assembly pins are removable from the brush holder when the actuator is assembled.

8. The electric-motor driven actuator according to claim 7, wherein the carrier plate is coupled via damping elements to a carrier plate housing and a carrier plate housing cover.

9. The brush holder according to claim 1, wherein the at least one damping element is configured as annular and the first or second brush holder component has at least one holding means, preferably a location pin, which holds the damping element.

10. The brush holder according to claim 2, wherein the guides are configured in the first and second brush holder components such that assembly pins inserted therein, which serve as securing means during transport and to simplify assembly when the first and second brush holder components are inserted, are coupled rigidly to each other at least in relation to a degree of freedom and at essentially the same time retain the brushes in a predefined assembly position.

11. The brush holder according to claim 3, wherein the first brush holder component comprises spigots, which when the actuator is assembled, project into cutouts in the motor housing and the carrier plate or through these.

12. The brush holder according to claim 1, wherein the first brush holder component comprises spigots, which when the actuator is assembled, project into cutouts in the motor housing or the carrier plate or through these.

13. The brush holder according to claim 3, wherein the first brush holder component comprises spigots, which when the actuator is assembled, project into cutouts in the motor housing or the carrier plate or through these.

14. The brush holder according to claim 4, wherein at least some of the guides in the first brush holder component run within and in an axial direction with respect to the spigots.

15. The brush holder according to claim 5, further comprising: a recess arranged in the first brush holder component to accommodate an earth contact, the earth contact being inserted therein, the recess and the earth contact configured such that the earth contact may be connected in an electrically conductive manner to a printed conductor on the carrier plate and, when the brush holder is incorporated, makes contact with the motor housing of the actuator.

16. The electric-motor driven actuator according to claim 7, wherein the carrier plate is coupled via damping elements to a carrier plate housing and a carrier plate housing cover.

17. The electric-motor driven actuator according to claim 7, wherein the carrier plate is coupled via damping elements to a carrier plate housing or a carrier plate housing cover.

* * * * *